United States Patent Office 3,832,274
Patented Aug. 27, 1974

3,832,274
FAST CURING ADHESIVES
William J. Owston, Edinboro, Pa., assignor to
Lord Corporation, Erie, Pa.
No Drawing. Filed June 6, 1973, Ser. No. 367,506
Int. Cl. C08c 11/12, 11/18; C08f 15/04
U.S. Cl. 161—183                           28 Claims

ABSTRACT OF THE DISCLOSURE

Improved, fast curing, flexible industrial adhesives with and without fillers, and articles bonded therewith, are described which adhesives comprise (A) about 1 to about 30% of an elastomeric polymer selected from the group consisting of (1) poly(butadiene) homopolymer, (2) a copolymer of butadiene with at least one copolymerizable monomer selected from the group consisting of styrene, acrylonitrile and methacrylonitrile, and (3) a copolymer of butadiene selected from the group consisting of homopolymer (1) and copolymers (2) modified by inclusion in the polymer of trace amounts up to about 5% of a functional monomer; (B) about 25 to about 85% of at least one polymerizable acrylic monomer selected from the group consisting of the acrylates, methacrylates, acrylonitrile and methacrylonitrile; (C) from 0 to about 50% of at least one ethylenically unsaturated non-acrylic monomer; (D) from 0 to about 60% of a polymer having an intrinsic viscosity in the range from about 0.1 to about 1.3 derived from at least one of said (B) and (C) monomers; (E) from about 5 to about 20% of methacrylic acid and (F) about 0.04 to about 4% of the reducing component of a redox catalyst polymerization system; said adhesives being compounded by selecting ingredients and proportions within the foregoing limits to produce a composition having a handleable cure time of not more than about 15 minutes and which is preferably within the range from about 4 to about 12 minutes.

BACKGROUND OF THE INVENTION

This invention relates to improved adhesive compositions which are curable to form flexible bonded joints which exhibit properties and capabilities previously unobtainable. Additionally, the compositions are capable of forming handleable, high strength bonds within minutes at room temperature.

Considerable attention is presently being devoted to the preparation of adhesive and coating compositions which may be applied under factory mass production conditions to a variety of surfaces or joints. In the case of adhesives, such compositions must meet increasingly rigorous performance requirements as, for example, when modern high performance engineering thermoplastics are used in assemblies. Successful adhesives must be able to provide structurally adequate bonds under the high impact, stress and varied environmental conditions for which polycarbonate, ABS (acrylonitrile - butadiene - styrene), polyphenylene oxide, modified polyvinyl chloride, acrylic, and other similar high performance plastics are chosen. Additionally, the adhesive or bonding process must not cause stress crazing or the dissolution attack and damage associated with many common solvents and other organic materials. A primary limitation of nearly all prior art adhesives is their specificity toward a given substrate material. For example, typically, one cement must be formulated specifically to bond polyvinyl chloride to itself while another different cement must be prepared to join polyacrylic plastics. Another serious limitation of solvent cements arises from their different softening effect on dissimilar plastics, which may render such solvent carried cements ineffective for bonding certain combinations of dissimilar plastics. An especially difficult problem of the prior art arises when thermosetting plastics, such as fiber reinforced polyesters are to be joined to metals. When an adhesive of the epoxy type is selected which is suitable for the metal, it frequently lacks adequate adhesion to the plastic surface to be bonded. Rigid, high strength metal adhesives also have been found to be too high in modulus to be useful in assemblies in which high impact plastics are used, or which require heated cures which damage the thermoplastic. Similarly, a solvent carried cement operative on a plastic component generally lacks adequate adhesion to the metal to be used to complete the assembly. Further, where prior art solution type cements are operative in bonding a plastic, considerable skill is required not only in confining the adhesive to the glue area, but also in recognition of the brief period, after application of the adhesive, during which a successful bond can be formed. Joining the surfaces too soon traps solvent, thus weakening the bond area, even causing later failure, especially where a gas or liquid seal is required in the bonded seam. An overly long delay in joining the surfaces permits the plastic and adhesive to dry, leading to poor wetting and alloying of the adhesive surfaces when pressed together, with resultant poor bonds.

The prior art cements which are aqueous dispersions of adhesive particles or are solutions in volatile organic solvents, have other long recognized inherent deleterious properties which limit or prohibit the use of such compositions in factory mass production techniques. For example, in ordinary cements, the liquid medium must be evaporated, which causes delay in the joining of the assembly sections, and hence increased expense in the manufacturing procedure. Moreover, there is a limit to the amount of adhesive polymer which can be incorporated into the liquid medium, leading to the necessity of applying several coats, interrupted by drying, to obtain, if desired, thick adhesive layers. Thick glue lines are frequently necessary to insure an adhesive seam sealed against gases and liquids, to dampen mechanical and sound transmission, or provide electrical insulation.

The presence of volatile organic solvents which must be evaporated, not only creates fire, explosion and toxicity problems, but also imposes serious use limitations in view of the ever more stringent environmental regulations which already severely limit the allowable organic solvent release into the atmosphere. Indeed, legislative limitations already scheduled to come into effect will soon preclude the use of many currently available solvent carried adhesives.

The foregoing disadvantages of solvent based adhesives, especially elastomer cements, have long been recognized and it has been proposed in the art to substitute adhesives employing polymers in vinyl or acrylic monomers as one means of avoiding these disadvantages. However, the actual use of such solutions has been largely limited to the production of molded shapes or thick, cast sheets. In most instances, such compositions require the use of three or more separate components, have poor shelf stability, and require cure times too lengthy for use in rapid, mass production factory applications. Most such compositions previously proposed were also so rigid and glassy upon curing that the normal demands of simple structural joints led to brittle fracturing, cleavage and peel delamination, impact failures, and embrittlement aging after exposure to thermal cycling or, simply, to low temperatures. Many of the limitations of the solvent carried cements and other adhesives are, nevertheless, solved by the polymer-in-monomer adhesives. For example, the problems of the gross evaporative evolution of harmful and usually flammable solvents, difficulty in building sufficient adhesive film thickness for gap sealing, and the specificity problems of bondable surfaces have been significantly reduced. However, the monomer content of such adhesives is necessarily so high, or the required cure time is so lengthly, that the solvating effect of the vinyl or acrylic monomers leads to the same type of severe attack or solvent stress crazing on sensitive thermoplastics which characterizes the solvent carried cements.

The problem of obtaining sufficiently fast adhesive hardening or handleable cure times, so as to meet the needs of rapid mass production techniques, has been solved by the invention of Owston U.S. Pat. 3,725,504 issued Apr. 3, 1973 by the incorporation of monomeric methacrylic acid in the adhesives in certain amounts, in the presence of selected concentrations and types of other polymerizable monomers. The resulting very fast curing adhesives yield bonds and adhesive layers which are extremely high in tensile strength and heat resistance, and which are capable of providing adhesion between many similar and dissimilar materials. However, due to the use of a syrupy polychloroprene-vinyl monomer-partial polymerization product, the hardened adhesives are rigid and susceptible to damage by bending, cleavage and peeling stresses. This disadvantage is characteristic of prior art compositions of the polymer-in-monomer types, and seriously limits their utility. The most serious limitations of such adhesives are the lack of resistance to impact shock and peeling forces. Other serious difficulties occur when high impact materials such as acrylic, polycarbonate and ABS plastics are bonded to form structural units such as appliance housings or other articles. The glassy rigidity of the adhesive limits flexural relief in the plastic areas contacted by the adhesive, thus impairing the ability of the plastic within the structure to absorp impact and other stresses. Such impairment of physical properties is manifested, for example, in the large difference between the tensile strength of a bonded joint and the strength of an equivalent cross section of the plastic. The high performance plastics are best joined with an adhesive intended to distribute and transmit the structural stress over a large load bearing joint, as compared to the use of several screws or rivets which provide stress concentration at several points. Engineering thermoplastics are generally selected for use to provide high resistance to stress when the structure is placed into service. A successful joint adhesive for such service, therefore, cannot, like prior art adhesives, rigidify the critical joint areas, embrittle the high impact plastic, transmit thermal and mechanical shocks from any metal or other components in the assembly, become brittle at low operating temperatures, solvent stress craze the plastic, or otherwise detract from the designed performance of the assembled plastic structure. In instances where the prior art has incorporated additives designed to modify the glassy and brittle nature of the hardened adhesive, severe interference with adhesion, environmental aging, and thermal resistance has been encountered. This is particularly true with the plasticizing agents commonly used to obtain flexibility in plastics, such as dioctylphthalate in polyvinyl chloride, for example. The use of other prior art additives, such as ordinary polychloroprene, leads to reduced strengths, phase separation, soft spots, and incompatibility, as is noted in the prior art. In summary, the prior art provides no teaching of how vinyl and acrylic monomers, plus dissolved or dispersed polymers may be used to prepare practical, adhesives which are flexible, resistant to embrittlement, and capable of hardening within several minutes at room temperature so as to be suitable for use in rapid mass production application and assembly techniques.

SUMMARY OF THE INVENTION

The present invention overcomes the disadvantages of the prior art solvent carried adhesives and polymer-in-monomer adhesives and for the first time provides adhesive compositions useful for industrial bonding operations which have satisfactorily short curing times for efficient operations and yet provide strong but flexible, impact resistant, environmentally stable bonds between a wide variety of substrates, even high performance engineering thermoplastics. The invention also includes articles bonded by the new adhesives. More specifically, the new adhesives can be used to join a wide variety of substrates including metals, plastics, glass, wood and the like to themselves or to other similar or dissimilar substrates to provide handleable bonds under ambient temperature conditions in not more than about 15 minutes and preferably in as little as about 4 to 12 minutes.

The new adhesives include as a minimum, an elastomeric polymer derived from butadiene, at least one acrylic monomer, methacrylic acid and the reducing component of a redox polymerization catalyst. The adhesives may optionally contain one or more ethylenically unsaturated non-acrylic monomers and a polymer having an intrinsic viscosity of about 0.1 to about 1.3 derived from one or more of the acrylic or non-acrylic monomers. The adhesive compositions may also contain stabilizers and other ingredients and inert fillers known to the art. The adhesives are prepared by simply mixing the ingredients according to conventional techniques, heating the mixture, if necessary, for a short period of time to a temperature of up to about 150° F. to aid in forming homogeneous solution. The adhesives are then cooled and stored for later use.

In use, the adhesives are completed by incorporation of or exposure to the oxidizing component of the redox catalyst system, and then applied to the work pieces by any suitable technique. The work pieces are then assembled and the adhesives are permitted to cure to handleable hardness at ambient temperatures. While any temperature in the ambient range may be employed, it will be obvious that the time of curing will be longer at lower temperatures and shorter at higher temperatures in that range. In any event, the adhesive compositions of the present invention are formulated to cure at ampient temperatures to provide handleable bonds in not more than about 15 minutes.

More specifically, the new adhesive compositions consist essentially of (A) about 1 to about 30% of an elastomeric polymer derived from butadiene selected from the group consisting of (1) poly(butadiene) homopolymer, (2) copolymers of butadiene with at least one mnomer selected from the group consisting of styrene, acrylonitrile and methacrylonitrile; and (3) a polymeric material selected from the group consisting of homopolymer (1) and copolymers (2) modified in each case by inclusion in the polymer in question a trace or minor amounts, i.e. about 0.1 up to about 5% by weight of the modified polymer, of a functional monomer. Suitable functional monomers include acrylic acid, methacrylic acid, maleic anhydride, fumaric acid, methylmethacrylate and chlorostyrene; (B) about 25 to about 85% of at least one acrylic monomer selected from the group consisting of acrylates, methacrylates, acrylonitrile, and methacrylonitrile; (C) 0 to about 50% of at least one ethylenically unsaturated non-acrylic monomer; (D) 0 to 60% of a polymer having an intrinsic viscosity in the range from about 0.1 to about 1.3 derived from at least one of the (B) and (C) monomers; (E) about 5 to about 20% methacrylic acid; and (F) about 0.04 to about 4% of the reducing component of a redox polymerization catalyst system. Except where specified otherwise, all percentages herein are based on the weight of the storable adhesive composition including the reducing component of the catalyst but not the oxidizing component which is added only just prior to use of the adhesive. In some instances, as in the examples, proportions are given in parts by weight which, however, will be seen in most instances to approximate percent by weight of the storable adhesive. It should be noted, however, that where the percentage involved is that of an ingredient of a major component, it is based on the total weight of that component and not the total weight of the adhesive composition as will be clear from the context, e.g. the percentage (0.1 to 5%) of functional monomer in the polymers (3) of component (A) is based on the weight of component (3), not the finished adhesive.

The above described adhesive compositions are stable on storage in a container for prolonged periods. Actual tests, for example, indicate that the adhesives are stable at 72° F. for at least six months. Accelerated storage or shelf-life tests have also shown that the compositions are stable for at least six weeks even at the elevated temperature of 110° F. Nevertheless, in the presence of a complete polymerization catalysis system, as by the addition of the oxidizing component of a redox catalyst system, the adhesives cure or harden to the point where a bonded assembly can be readily handled without relative movement of the bonded parts and consequent disruption of the seal line in not more than about 15 minutes at room or ambient temperatures. The time period between the onset of catalysis and obtaining a handleable bond may be referred to as the "cure time," "hardening time" or "handleable bonding or cure time." Preferred adhesive compositions of the invention have handleable cure times of from about 4 to about 12 minutes at room temperature and shorter cure times at elevated temperatures in the ambient range.

Component (A) may be any butadiene based elastomer having a glass transition temperature sufficiently below the ambient temperature of use to afford a cured adhesive providing a useful bond. As will be obvious to those skilled in the art the comonomers and trace or minor amounts of functional monomers referred to above will have an effect on the glass transition temperature of component (A). With these factors in mind, it is desirable that the composition of component (A) be such as to provide a glass transition temperature below ambient temperature and preferably not above about 15° F. for most purposes. As noted above, component (A) may be butadiene homopolymer, a copolymer of butadiene with styrene, acrylonitrile or methacrylonitrile, or the homopolymer or these copolymers modified by copolymerization therein of trace or minor amount (about 0.1 to about 5%) of a functional comonomer, such as acrylic acid, methacrylic acid, maleic anhydride, fumaric acid, methylmethacrylate or styrene. Examples of all of these elastomers are available commercially, e.g., the acrylonitrile-butadiene copolymer rubbers, with and without modifying trace or minor amounts of functional comonomers are available under the trademark "Hycar" from the B. F. Goodrich Company. Butadiene homopolymer is also available commercially both *per se* and modified with minor amounts of funtcional monomer. Butadiene copolymers with styrene and methacrylonitrile are also commercially available. It is generally preferred to employ about 8–12% of such elastomers, but as noted above as little as 1% and as much as 30% may be employed under conditions explained below.

In addition to the elastomer (A), the new adhesive compositions may contain about 25 to about 85% by weight of a monomer of the acrylic type, selected from the group consisting of the acrylates, methacrylates, acrylonitrile and methacrylonitrile. The identity of useful acrylates and methacrylates will be apparent to those skilled in the art and includes, without limitation, the lower alkyl acrylates and methacrylates, containing up to 1–8 or more carbon atoms in the alkyl group or groups, among which may be mentioned as especially preferred, isobutyl acrylate, 2-ethyl-hexylacrylate, methyl methacrylate, isobutyl methacrylate, hexyl methacrylate and diethylene glycol dimethacrylate, among others. It is generally preferred to employ at least 25% of such monomers, although this may be made up of one or several monomers of this type. The preferred monomer is methyl methacrylate.

The new compositions may optionally contain from 0 up to about 50% of (C) an ethylenically unsaturated but nonacrylic monomer. Suitable monomers for this purpose include styrene, chlorostyrene, vinyl toluene, and vinyl acetate and the like.

Another optional ingredient (D) which may be included in amounts from 0 up to about 60% is a polymer having an intrinsic viscosity of from about 0.1 up to about 1.3 which is derived from one or more of the (B) acrylic and/or (C) nonacrylic monomers, i.e., the acrylates, methacrylates, acrylonitrile, methacrylonitrile, styrene, chlorostyrene, vinyl toluene and vinyl acetate. Indeed, suitable polymers for component (D) may be derived from two or three or more of said monomers, e.g., methylmethacrylate/n-butyl acrylate/ethylacrylate (90/5/5%); n-butyl methacrylate/isobutyl methacrylate (50/50%); n-butyl methacrylate homopolymer; or ethyl methacrylate homopolymer, among others. It is generally preferred that the viscosity of such polymers be about midway in the recited range, a viscosity of about 0.8 for the 90/5/5% methylmethacrylate/n-butyl acrylate/ethylacrylate polymer being preferred for example. These polymers are preferably employed in amounts of about 10–40% although they may be employed in concentrations of up to 60% or omitted altogether, as explained more fully below.

Component (E) is always methacrylic acid and is employed in amounts from about 5% to about 20% to control the hardening time of the adhesives as explained more fully hereinafter.

Any suitable redox polymerization catalyst system may be employed; the concentration of the reducing component incorporated in the adhesive being about 0.04 to about 4%. Suitable reducing components include, without limitation, diethyl-p-toluidine and the preferred diisopropanol-p-toluidine or mixtures thereof. Other suitable reducing components known to the art may also be employed. The storage-stable adhesive composition containing the reducing component of the catalyst is initiated by incorporating the oxidizing component of the catalyst in a suitable proportion known in the art, just prior to applicaion of the adhesive. Suitable oxidizing agents for this purpose are well-known in the art and include the peroxides; benzoyl peroxide being especially suitable. Suitable benzoyl peroxide catalyst compositions are commercially available, such as "Cadox B-160," which is a 55% benzoyl peroxide paste in n-butyl benzyl phthalate which is suitably employed at a concentration of the order of 3% of the adhesive.

It is desirable to include a polymerization inhibitor or stabilizer, suitably of the quinone type, such as toluhydroquinone or p-benzoquinone, at concentrations of the order of 0.004 to 0.005% to optimize the shelf life of the adhesive compositions.

Paraffin wax may be added in concentrations on the order of 0.3 to 0.5% to retard evaporation of volatile monomers and to occlude atmospheric oxygen from the adhesive composition.

The adhesives of the present invention may be used to bond a wide variety of substrates including metals, synthetic plastics and other polymers, glass, ceramics, wood, and the like. The adhesive is applied to one or both of the surfaces to be joined, and the assembly is joined and permitted to stand at ambient temperature. One of the principal advantages of the present invention is that the new adhesives provide flexible bonds between high performance engineering plastics thus precluding loss of the desirable physical properties of such materials by the use of more rigid or brittle adhesives. Moreover, the new adhesives provide such flexible bonds in desirably short periods of 4–12 minutes or not more than about 15 minutes, without the need for solvent removal, and thus are adapted for use in economical production cycles.

EXAMPLES OF THE INVENTION

The invention is illustrated by the following examples which are given without intention that the invention be limited thereto. All concentrations of ingredients in these examples are given in parts by weight.

Example 1

This example illustrates the differences between the present invention and a rigid adhesive of my earlier U.S. Pat. 3,725,504 issued Apr. 3, 1973, not within the scope of the present invention. The graft copolymer of U.S. Pat. 3,725,504 contains polychloroprene, poly(methylmethacrylate)-(styrene), wherein the polymers other than the elastomers are prepared by partial polymerization, resulting in a partially polymerized syrup containing polymer free from unpolymerized monomers. Such a partially polymerized syrup, thought to contain partially grafted polychloroprene, when used in a fast hardening adhesive formula, of the type disclosed in U.S. Pat. 3,725,504, yields a rigid, non-flexible adhesive when it is cured. Such high modulus, inflexible adhesives, while useful in some applications, impart these same properties to assembly joints in which they are used, yielding joints of limited flexibility, low impact resistance and less desirable physical properties than those of the compositions of the present invention.

TABLE I

| Component: | Ingredient | Parts by weight IA | IB |
|---|---|---|---|
| A | Medium molecular weight acrylonitrile-butadiene elastomer, glass transition temperature of −22° C., Mooney viscosity of 55, ("Hycar" rubber 1052). | 8 | 8 |
| B | Methylmethacrylate monomer | 51.0 | 61.0 |
|  | n-Butyl methacrylate monomer | 8.0 | 8.0 |
| D | Medium molecular weight copolymer of methylmethacrylate/n-butylacrylate/ethylacrylate, 90/5/5, intrinsic viscosity of 0.80. | 21.0 | 21.0 |
| E | Methacrylic acid | 1.0 | |
| F | Diisopropanol-p-toluidine | 1.0 | 1.0 |
|  | Paraffin wax, melt index of 52° C | 0.3 | 0.3 |
|  | Toluhydroquinone | 0.005 | 0.005 |
| Hardening time (10 gm. mass) min | | 11.5 | 44 |

For comparison, an adhesive was prepared according to Example 2 of U.S. Pat. 3,725,504. This adhesive is referred to hereinafter as rigid adhesive A.

The adhesives IA, IB and rigid adhesive A, were catalyzed with a 55% benzoyl peroxide in butyl benzyl phthalate paste ("Cadox" B–160), at a concentration of 3 parts paste per 100 parts of each respective adhesive resin.

The catalyzed adhesives were used to bond overlap test assemblies respectively of sand blasted cold rolled steel, sand blasted aluminum, polycarbonate coupons cut from 1/8" thick sheet stock ("Lexan" S100–112), ABS plastic coupons cut from 1/8" sheet stock ("Cycolac" T). In addition to bonding the materials to themselves, test assemblies were also formed by bonding the steel to ABS in overlap joints. For testing cleavage and peel strengths, strips of two different gauge thicknesses of aluminum ware bonded together. One gauge was 20 mils, the other 60 mils in thickness. The latter assembly, referred to as a T-peel test assembly hereafter, was tested by separating the ends of the bonded sections at a controlled rate, at one end of the assembly, causing peel and cleavage stresses within the bonded joint area.

The adhesives were also cast into sheets 20 mils in thickness for use in testing the flexibility of the hardened adhesives.

The various single overlap assemblies were prepared with 20 mil glue line thicknesses, and ½" single overlap bonded area. Each assembly was tested by shear separation of the joints on a test machine. The results were as follows:

TABLE II

| Adhesive | Test assembly | Bond strengths |
|---|---|---|
| A | Cold rolled steel | 2,800 p.s.i. |
| IA | do | 3,450 p.s.i. |
| IB | do | 2,200 p.s.i. |
| A | Aluminum | 2,900 p.s.i. |
| IA | do | 3,600 p.s.i. |
| A | Polycarbonate | 620 p.s.i. |
| IA | do | 750 p.s.i. |
| IB | do | 500 p.s.i. |
| A | ABS | 490 p.s.i. |
| IA | ABS | 620 p.s.i. |
| A | ABS to steel | 550 p.s.i. |
| IA | do | 700 p.s.i. |
| A | Aluminum T-peel assembly | 18 p.l.i. initial, 4 lbs. peel. |
| IA | do | 41 p.l.i. initial, 18 lbs. peel. |

TABLE III

| Adhesive: | Time in minutes required to harden, 70° F. |
|---|---|
| A | 10.5 |
| 1A | 11.5 |
| IB | 44 |

The cure time data illustrates the very rapid cure times of rigid adhesive A and flexible adhesive 1A. The cure time of 1B is in contrast to 1A, pointing to the importance of the methacrylic acid in the fast cure adhesive. To show the extreme importance of obtaining a fast cure, within a 5 to 15 minute range at room temperature, a comparison of bonded assembly output rates is made in the following table, corresponding to several adhesive curing time cycles:

TABLE IV

| | Time in minutes | | | | |
|---|---|---|---|---|---|
| Application of adhesive, time, medium size assembly | 2 | 2 | 2 | 2 | 2 |
| Necessary dwell-wet-out period at 70° F. before gel | 2 | 2 | 2 | 2 | 2 |
| Excess time in bonding sequence | 1 | 6 | 11 | 26 | 36 |
| Hardened-handling time | 5 | 10 | 15 | 30 | 40 |
| Assembly output rate per hour for each assembly fixture | 12 | 6 | 4 | 2 | 1½ |

As can be noted from the table, the cost, in terms of variable time and overhead hours required per assembly, is greatly affected by the cure time of the adhesive used. For most mass produced assemblies, a 15 minute cure time is about the longest acceptable time in terms of the bonding procedure cycle. Comparing 1A and 1B in terms of assembly output per bonding fixture, 1A would yield 5 units per hour. In contrast, the yield rate of 1B would be only 1.5 units at 70° F. The economics of the required procedure times largely determine whether or not an adhesive is a practical and useful composition. In comparison to adhesive 1A, adhesive 1B can be seen to be relatively impractical in economic efficiency. Thus, the difference between even 15 minutes and 35 minutes in hardening time becomes of critical importance in the art of industrial adhesive bonding. Table II contains a comparison between the rigid adhesive A and a flexible adhesive composition of this invention. Considerable differences are apparent between the two adhesives in all of the tested assemblies. The metal assemblies, in particular, bonded with adhesive 1A exhibit strengths much higher than those bonded with composition A. The threshold of destructive failure for the flexible IA adhesive was higher than that of the rigid and stiffened adhesive A. Without the methacrylic acid, the strengths of adhesive IB were much reduced from those of adhesive 1A. The bond strengths on the plastic assemblies were higher for the flexible adhesive, which may be due to the fact that the flexible adhesive leads to less rigidification of the ductile, high impact plastic in the bonded joint area. Adhesive 1B, with the much longer dwell time prior to hardening apparently leads to considerable solvation of the plastic, much beyond the desirable minimum wet-out, causing sufficient solvent stress crazing to produce lower assembly strengths and weakened joints.

From the cast sheets of the hardened adhesive, ½ inch wide strips were cut for testing the flexibility of the respective adhesives. The individual strips were tested by bending to smaller radii over the sharp edge of a vise jaw in which the end of the strip was securely anchored. Rigid adhesive A could not be bent more than about 45° before it fractured. Adhesive 1A was repeatedly bent 90° in first one direction and then in the reverse direction without fracture. The 1A films were also bent double to 180° and creased with a metal vise. The severe creasing failed to fracture the film. One-half inch wide films of A and 1A were also subjected to elongation tests to evaluate the comparative modulus at break and the capacity to elongate and flex before failure. The elongation test results are set forth in the following table:

TABLE V

| Adhesive | Test | Results |
|---|---|---|
| A<br>1A | Tensile modulus at break, Mb | 5,600 p.s.i.<br>6,500 p.s.i. |
| A<br>1A | Elongation at break, Eb | 1%<br>14% |
| A<br>1A | Crazing threshold of film, elongation | <1%<br>8% |

The comparative flexibility measurements show 1A to be much more flexible and resistant to various strain tests than rigid adhesive A.

Two each of the ABS to cold rolled steel overlap bonded assemblies were subjected to an impact test using a Gardner impact tester. The bonded joint areas were subjected to an impact of 30 ft.-lbs., using a ⅝" size mandrel. The joint bonded with rigid adhesive A was fractured within the adhesive material. Adhesive 1A was not ruptured and remained intact.

Example 2

This example illustrates the use of butadiene homopolymer and copolymer elastomers as a base for the adhesive compositions of this invention. The use of modified butadiene copolymers, such as those which contain from about 1 to about 5% of functional monomers as additional comonomers, specifically acidic functionality, are included in this example, as IIA.

The adhesive ingredients were mixed together, under mechanical agitation, until a smooth mixture was obtained. The mixture was heated to 130° F. for several minutes to complete the dissolution and then cooled to room temperature for use and storage. Adhesive IIA was stored for six months at 72° F. without a significant change in its viscosity or the quality of adhesive bonds it formed. It was also stored at 110° F. for six weeks with only a small increase in viscosity and no effect on the bonds obtained. Such storage capability is essential for practical industrial use, and is frequently difficult to achieve in extremely reactive and fast curing coating or adhesive compositions. Inasmuch as adhesive having extremely fast hardening rates would normally not be expected to be stable on storage, it is an important object of this invention to provide shelf storable adhesives which can be made infrequently and stored for later use without the gelation, viscosity changes, cure time drift or other common problems associated with many unsaturated adhesive or sealing compositions of the prior art.

The adhesives were catalyzed with a commercially available benzoyl peroxide paste, "Luperco" AFR-55, at a concentration of 3 parts of paste per 100 parts of adhesive. The hardening times were as follows in 10 gm. masses:

TABLE VII

| Adhesive: | Cure time in minutes |
|---|---|
| IIA | 9.0 |
| IIB | 9.5 |
| IIC | 9.0 |
| IID | 10.5 |

Catalyzed portions of the adhesives were used to bond ABS rubber ("Cycolac" T) to itself, ABS to sand blasted cold rolled steel, and aluminum oxide blasted aluminum to itself. All assemblies were single overlap, ½" wide, test joints with 30 mil glue line thicknesses. Bond tests were conducted one hour after joining the assemblies. All assembly joints were sufficiently hardened and bonded that each was handleable, and could be moved without damage, after a fifteen minute layover period following the joining of the parts. The test assemblies were tested to destruction by shearing on a test machine. The

TABLE VI

| Component | Ingredient | Parts by weight | | | |
|---|---|---|---|---|---|
| | | IIA | IIB | IIC | IID |
| A | Medium molecular weight acrylonitrilebutadiene copolymer, with a small proportion of a comonomer containing the carboxylic acid functional group, glass transition temperature of −20° C. Mooney viscosity of 50 ("Hycar" 1072). | 12 | | | |
| | Medium molecular weight acrylonitrilebutadiene copolymer ("Hycar" 1052) | | 12 | | |
| | Medium molecular weight butadiene homopolymer ("Trans-Pip" X5) | | | 8 | |
| | Medium-high molecular weight butadienestyrene copolymer elastomer, 76/24, Mooney viscosity of 120 ("Ameripol" 1012). | | | | 10 |
| B | Methylmethacrylate monomer | 61.5 | 61.5 | 55.5 | 54.5 |
| | Hexyl methacrylate monomer | | | 14.5 | 8 |
| D | Medium molecular weight copolymer of methylmethacrylate/n-butyl acrylate/ethylacrylate 90/5/5, viscosity 0.80. | 16 | 16 | | 18 |
| | Medium molecular weight copolymer of n-butyl methacrylate/isobutyl methacrylate, 50/50, intrinsic viscosity of 0.61. | | | 10 | |
| E | Methacrylic acid | 9 | 9 | 11 | 8 |
| F | Diisopropanot-p-toluidine | 1.5 | 1.5 | | |
| | Diethyl-p-toluidine | | | 1.2 | 1.2 |
| | p-Benzoquinone | 0.004 | 0.004 | 0.004 | 0.004 | plastics were ⅛″ thick, the steel 60 mils, and the aluminum 60 mils in thickness:

TABLE VIII

| Adhesive | Test assembly | Results (p.s.i.) |
|---|---|---|
| IIA | ABS to ABS | 650 |
| IIB | do | 625 |
| IIC | do | 610 |
| IID | do | 615 |
| IIA | ABS to steel | 720 |
| IIB | do | 750 |
| IIC | do | 650 |
| IID | do | 670 |
| IIA | Aluminum to aluminum | 4,300 |
| IIB | do | 4,100 |
| IIC | do | 3,100 |
| IID | do | 3,300 |

All of the assemblies containing at least one plastic section yielded failures within the plastic (ABS) material, leaving the bond area intact. One of the ABS to steel assemblies bonded by adhesive IIA was subjected to an impact by striking with a ⅝″ mandrel of a Gardner impact tester with a force of 30 ft.-lbs. The adhesive joint remained intact, the adhesive was uncracked. The impacted assembly yielded an ABS failure, with a strength of 560 p.s.i., when subsequently tested by shearing. Adhesives IIB and IIC were used to join two 40 mil thick sheets of ABS together. After hardening, the bonded, two-ply composite section was bent to a severe angle by anchoring in a metal vise and bending to a small radii. The adhesives did not crack or separate from the plastic surface during or after the applied flexing and shearing strain. In addition, the ABS did not exhibit any evidence of being solvent stress attacked or crazed by the brief contact with the adhesive when it was applied in its catalyzed, liquid state just before joining the sheets. The dwell time between the time of initial contact with the plastic and gelation of the adhesive was about five minutes. Adhesives IIA and IID were cast into 20 mil sheets from which ½″ wide strips were cut. These strips were bent 170° and creased, under compression, by a metal vise. The adhesive films did not fracture and were straightened without severe weakening of the zone or area of the crease. The creased section of adhesive IIA was compared to an uncreased area of the same sheet by measuring the tensile modulus at break. The creased film exhibited a strength of 4800 p.s.i. versus 6400 p.s.i. for an uncreased adhesive film; a retention of 74% of original strength after a severe flex test.

Example 3

This example demonstrates the practical and operative limits of this invention in regard to the concentration of the elastomer. The butadiene based elastomer adhesive is also compared with other elastomers to illustrate the important properties which are selectively obtained with the present invention.

If the butadiene based elastomer is present in too high concentrations, the cured adhesive may tend to lack sufficient heat resistance for many applications, be too thick for practical use, or become softened or exhibit incompatibility during the cure, thickening when marginally solvated, or dispersed ingredients, such as an overly large quantity of elastomer, will tend to phase separate. The concentration when many of the undesirable properties arise, such as the lowered modulus of the cured adhesive, is approximately at the 30% level, by weight, of the elastomer. Even at the higher operative concentrations, brief milling is usually required to produce a suitable and useful adhesive viscosity. Milling, in some cases, may reduce the storage stability of the resulting adhesive. At the higher concentrations, lower molecular weight elastomers must be used to avoid the long milling times which might impair stability.

The lower end of the range of useful concentrations of the elastomer is about 1%. Low concentrations of elastomer may be desirable when a low viscosity adhesive is desired, such as for applications wherein the bonding procedure indicates a spraying method of application onto assembly parts. Spraying, particularly air-less spraying, is frequently an economical and desirable technique of application for use in the bonding and assembling process. In compositions where all operative compensations are made for low levels of the elastomer without sacrificing or forfeiting the benefits of the rubber, the lower limit is approximately 1%, by weight.

Below about 1%, insufficient elastomer is present to impart the benefits described in this invention. At low concentrations, benefits are frequently obtained by the use of higher molecular weight elastomers to partially offset the effect of the lower total concentration of the rubbery phase in the adhesive.

Polychloroprene, an elastomer frequently employed in solvent carried elastomer cements and certain other prior art adhesives is compared to butadiene based compositions of this invention. The favorable performances of the elastomers of this invention are in contrast to that of polychloroprene, which has been used in prior art cements. The adhesives of Example 3 are:

TABLE IX

| Component | Ingredient | Parts by weight | | | | |
|---|---|---|---|---|---|---|
| | | IIIA | IIIB | IIIC | IIID | IIIE |
| A | Acrylonitrile-butadiene copolymer elastomer, 34/66 ("Krynac" 803) Mooney viscosity of 47, second order glass transition temperature of −23° C. | 1 | 30 | 12 | 6 | |
| | Polychloroprene, "Neoprene" WRT | | | | 6 | 12 |
| B | Methylmethacrylate monomer | 62 | 55 | 60 | 60 | 60 |
| D | Copolymer of methylmethacrylate/n-butyl acrylate/ethylacrylate, 90/5/5, listed in Example 1. | 28 | 5 | 18 | 18 | 18 |
| E | Methacrylic acid | 9 | 9 | 9 | 9 | 9 |
| F | Paraffin wax | 0.5 | 0.5 | 0.5 | 0.5 | 0.5 |
| | p-Benzoquinone | 0.005 | 0.005 | 0.005 | 0.005 | 0.005 |

The adhesives were prepared by blending the ingredients together during mechanical agitation with warming to 120° F. for about 10 minutes. In the case of adhesive IIIB, the elastomer was masticated on a cold rubber mill for 5 minutes prior to its dissolution in the monomer portion, B. Each adhesive was catalyzed as described in Example 1, and used to bond sand blasted cold rolled steel. The bond strengths of the 1″ wide test assemblies with single ½″ overlaps were tested as follows after 20 minutes and 1 hour, respectively:

TABLE X

| Adhesive | Test assembly | Results (p.s.i.) after— | |
|---|---|---|---|
| | | 20 min. | 60 min. |
| IIIA | Steel | 2,800 | 3,200 |
| IIIB | do | 1,600 | 2,900 |
| IIIC | do | 3,600 | 4,200 |
| IIID | do | 1,200 | 1,750 |
| IIIE | do | 1,100 | 1,800 |

The respective adhesives were also cast into 20 mil sheets, after catalyzing according to Example 1, and permitted to harden. One-half inch wide strips cut from the sheets were tested according to the flex test described in Example 1 where one end of the strip was anchored in a metal vise and the film bent to smaller radii. Adhesives IIIA, IIIB and IIIC did not fracture, although adhesive IIIA exhibited mechanical crazing and became physically weakened when bent at a sharp 90° angle. Adhesives IIID and IIIE exhibited severe crazing and actual crack failures. Adhesives IIIB and IIIC passed the 180° bend test described above plus a compressive crease test in a metal vise of the creased area without fracture. Adhesive IIIA crazed but did not break. Adhesive IIIA was much weakened by the creasing action. Adhesives IIID and IIIE, containing the polychloroprene, failed by cracking at the crease area. The modulus at break for each of Example 3 adhesives is as follows:

TABLE XI

| Adhesive | Modulus at break, Mb (p.s.i.) | Elongation at break, Eb (percent) |
|---|---|---|
| IIIA | 5,400 | 6 |
| IIIB | 3,100 | 22 |
| IIIC | 6,200 | 14 |
| IIID | 4,700 | 9.5 |
| IIIE | 4,300 | 3 |

The flexibility measurements of the IIIA and IIIB adhesives, representative of the operative limit areas for the elastomer show significant reductions in properties as compared to the preferred and optimal IIIC adhesive. The IIIA and IIIB adhesives are on the periphery of being acceptable, for most applications, of high strength yet flexible adhesive. Composition IIIB is noted to be low modulus in comparison to the desirable IIIC and would suffer from lack of heat resistance in many applications. IIIA has poor flexibility and is much more rigid than IIIC. Its impact resistance would suffer under many conditions in which its use might be normally considered, especially in areas where shock transmitting metals are used or for high impact applications with engineering plastics such as ABS or polycarbonate thermoplastics. In such situations, the high modulus of the IIIA adhesive would be a drawback, if it fails to absorb impact or strain without the capacity to permit stress relief. Multiple impacts with a Gardner impact tester provides an elementary comparison between IIIA and IIIC. The cast sheets are 50 mils in thickness, cast upon "Cycolac" T sections which were cut from ⅛" thick sheet stock:

TABLE XII

| Adhesive | Assembly | Impact type | Results |
|---|---|---|---|
| IIIA | Cast sheet on ABS. | 10 ft. lbs., 5 cycles. | Slight crazing. |
| IIIC | | | No crazing. |
| IIIE | | | General crazing. |
| IIIA | Cast sheet on ABS. | 20 ft. lbs., 5 cycles. | Crazing and cracking. |
| IIIC | | | Denting, no crazing. |
| IIIE | | | Cracking, some lift-off of adhesive from ABS, ABS crazing. |

The preferred composition IIIC yielded greater impact resistance than either IIIA or IIIE. The adhesives containing the polychloroprene yield a comparison between butadiene based elastomers and another elastomer frequently used in adhesive compositions. It is theorized that the polychloroprene is not as compatible as the butadiene types under the various formula restrictions which are present in a fast curing, flexible adhesive.

The marginal results of adhesives IIIA and IIIB form the basis of using the approximate levels of the elastomer concentration as the approximate operative limits for practical, flexible fast curing adhesives. In the case of the IIIB adhesive, such a high elastomer content limits the practical use since the viscosity is very high and the adhesive resin tends to be difficult to mix and apply to a surface. Mechanical metering or spraying, or other common favored and economical procedures are not possible as application methods.

Example 4

This example illustrates the practical operative limits of the component B and C monomers, methacrylic acid, and the polymer additives of component D. The methacrylic acid is present in preferred concentrations of from about 8 to 12%, by weight. In order to obtain the preferred and necessary fast cures, as illustrated as a goal for mass production assembling techniques in Example 1, the methacrylic acid should be present in concentrations of at least 7% levels. If the polar methacrylic acid is used in concentrations higher than about 20%, it tends to yield sufficiently rigid adhesives to circumvent the invention goal of providing a flexible and impact resistant adhesive.

The monomer concentration, other than methacrylic acid, may range from about 25 to about 85%, of one or more monomers selected from the group consisting of acrylates, methacrylates, acrylonitrile and methacrylonitrile. The limits of the monomer concentration is based upon practical requirements commensurate with the formulation of flexible, yet fast curing adhesives with hardening rates of not more than about 15 minutes and preferably in the 4 to 12 minute range. If the monomer level is reduced to below about 25%, the result is a viscosity so high that a paste or semi-solid gel is obtained. Generally, with the viscosity exceeding about the 300,000 to 500,000 cps. range, the application of suitably thin coat, and subsequent spreading becomes difficult and impractical. Even more damaging to the practical use of very high viscosity compositions is the increasingly ineffective wetting of bond surfaces, especially metals and plastics. "Wet-out" of the bond surfaces is severely limited and is further affected by the usually faster gelation of high viscosity, fast hardening adhesives. The wetting of the surface must occur before the gel point is reached. The 25% monomer concentration is the area of the lower limit of associated wetting periods under the constraint of cure times of at or below about 15 misutes. When the monomer portion is increased to above about the 85% level, the viscosity of the adhesive becomes very low, and lacks resinous body and integrity. An adhesive at very low viscosities, below perhaps 1000 cps., or 500 cps., tends to flow uncontrollably outward in all direction after deposition, forming very thin films. The adhesive will often flow away from the bond areas, requiring expensive clean-up procedures or destroying a painted or otherwise prepared surface. The outflow problem is particularly critical on sensitive plastic surfaces where the adhesive will solvate, mar, or adhere tightly to the surface, as it is designed to do in normal use. Very low viscosities also have the drawback of not being able to fill voids and irregular gaps which routinely occur with poorly mated assembly parts. Many assemblies are designed with insulation joints, spaced joints or joints warped from being handled unevenly in a still heated condition when removed from a mass production mold, leaving an undesigned warp in the section. Thus, many situations require a gap filling adhesive composition. Another limitation that is caused by increasing the monomer levels above about 85% is a lengthening cure time. Beyond about 85% levels of monomers, the 15 minute or shorter cure time, a prime goal of the invention, becomes impossible if the criteria of a flexible adhesive is still to be met. In order to keep the monomer concentrations within the practical and operable limits set forth, it is frequently necessary to include a polymer in addition to the elastomer, as a diluent. The presence of the additional polymer D, also aids in maintaining adequate viscosities to avoid low viscosities which may flow uncontrollably. Polymers formed from unsaturated compounds which are similar in chemical type to the acrylic monomers are most compatible and form excellent mixtures which remain compatible even as the free monomer of the adhesive is converted to polymer, reducing the overall solvating capacity of the composition. Such compatibility requires polymers formed from similar monomers and materials such as acrylic or vinyl compounds. As a modifying additive or diluent, the molecular weight of the polymer is important as it will affect directly the viscosity of the adhesive and wetting capacity of the resultant adhesive. These and other factors dictate the limits of the concentration of the polymers that can be introduced into the composition. Polymers are best classified as to their inherent viscosity, a measurement of the combined effects of molecular weight and relative solubility in given reference solvents. For practical purposes, the polymer additives of the present invention should exhibit intrinsic viscosities between about 0.1 and about 1.3 to produce ranges of practical adhesive viscosity between about 0.15 and about 1.0, except for special applications requiring spraying or unusual toughness, which may require polymers having a viscosity outside this range, up to a value of about 1.3.

In addition to the acrylic monomers, component B, other unsaturated, polymerizable monomers may be included as comonomers. The non-acrylic monomers must be selected with care so as to not affect the fast cure of the adhesive. Such monomers as chlorostyrene and vinyl toluene, for example, are more suitable at higher concentrations than is styrene because they polymerize more rapidly in the presence of the acrylic monomers. The effective upper limit is about 50%, for the total concentration of non-acrylic monomers, whereupon the cure time begins to significantly exceed the desired 15 minute time span. The earlier detailed description of the invention carries a partial listing of suitable non-acrylate monomers which contain ethylenically unsaturated, coreactive groups. The adhesives illustrating the limits set forth in this example to obtain fast curing, yet flexible and impact resistant adhesives, had the following compositions:

preferred cure times are at or below the 10 or 12 minute range, cure time effects are an aid in establishing the operative and preferred ranges of adhesive ingredients. The cure time of IVA is just within the range for an acceptable fast cure rate under the criteria of this invention. The 85% concentration yields a low viscosity adhesive which is subject to outflow from the bond area, damaging or disturbing the esthetics of many types of surfaces. The use of very high relative concentration of component B monomers tend to form very rigid polymer in the case of methacrylates or low modulus and weakened polymer in the case of acrylates, which detracts from the desired high impact strength and attendant high modulus flexibility in the hardened adhesive. Adhesive IVA was tested for flexibility by bending and creasing in a metal vise. The results are noted in the following table. The adhesive film survived the creasing stresses but exhibited mechanical stress crazing and was left with much reduced tensile strength within the crease area. A casting of adhesive IVA was prepared, ¼" in thickness, which was hardened and impacted with 30 ft.-lbs. by a Gardner impact tester, using a ⅝" wide mandrel. The impact caused severe crazing on the impact area. In comparison, adhesive IIA, likewise tested, yielded only an indentation without crazing. The various marginal properties of IVA indicate the upper concentration limits of operation for the component B monomer.

Table XIV A

| Adhesive | Test | Results |
|---|---|---|
| IVA | Bend to 90° | Stress craze whitening. |
| IVA | Creasing in vise to 180° | Severe crazing, weakened crease area. |
| IVA | Flexing of crease area | Film fracture. |

TABLE XIII

| Component | Ingredient | Parts by weight | | | | | | | |
|---|---|---|---|---|---|---|---|---|---|
| | | IVA | IVB | IVC | IVD | IVE | IVF | IVG | IVH |
| A | Carboxylated acrylonitrile-butadiene elastomer ("Hycar" 1072) | 3 | 8 | 1 | 13 | 12 | 12 | 12 | 12 |
| B | Methylmethacrylate monomer | 70 | 25 | 25 | 47 | 66.5 | 64.5 | 51.5 | 56.5 |
| | 2-ethyl hexyl acrylate monomer | | | | | 9 | | | |
| | Diethylene glycol dimethacrylate | | | | | 2 | | | |
| | n-Butylmethacrylate monomer | 15 | | | | | | | |
| C | Styrene monomer | | 5 | | | | | | |
| | Chlorostyrene monomer | | | 15 | | | | | |
| D | Methylmethacrylate/n-butyl acrylate/ethyl acrylate copolymer of Example 1. | | | | | 18 | 15 | 15 | 15 |
| | n-Butyl/isobutyl methacrylate, 50/50 copolymer, medium molecular weight, intrinsic viscosity of 0.6. | | | | 30 | | | | |
| | n-Butyl methacrylate homopolymer, medium high molecular weight, intrinsic viscosity of 0.5. | | 36.5 | 22 | | | | | |
| | Ethyl methacrylate homopolymer, intrinsic viscosity of 0.25 | | | | 10 | | | | |
| E | Methacrylic acid | 11 | 9 | 10 | 10 | 5 | 7 | 20 | 15 |
| F | Diisopropanol-p-toluidine | 1.5 | 1.5 | 1.5 | 1.5 | 1.5 | 1.5 | 1.5 | 1.5 |
| | 2,6-ditert-butyl-p-cresol | 0.01 | 0.01 | 0.01 | 0.01 | 0.01 | 0.01 | 0.01 | 0.01 |

The ingredients were blended together by agitating at a temperature of 150° F. for several minutes, followed by continued stirring at room temperature until a smooth, complete solution was obtained. For use, each adhesive was catalyzed by stirring 4 parts of a 55% benzoyl peroxide in butyl benzyl phthalate paste into 100 parts of the respective adhesive resin. Hardening times for compositions IVA through IVD were as follows:

Table XIV

Hardening Time of 10 gram mass
Adhesive:                     Minutes, 70° F.
IVA ------------------------------------ 14.0
IVB ------------------------------------ 11.0
IVC ------------------------------------ 4.5
IVD ------------------------------------ 8.0

In meeting the fast cure objectives set forth in this invention, especially the criteria of fast curing adhesives which meet the practical economic requirements established in Example 1, practical limits are necessary for the various components of the adhesive. As preferred hardening times are less than about 15 minutes, and most Adhesive composition IVB contains only 25% of component B monomers. Component C monomers are employed to aid in making the composition as fluid as possible. In such cases where highly reactive component B materials are present in low relative concentrations, the use of less reactive component C monomers must be limited, depending upon the individual monomer. The constraints of an increasingly impractical viscosity on one side and the limits necessary in obtaining the fast cure rate and flexibility on the other, combine to determine the 25% lower limit for component B monomers. The viscosity of IVB was 180,000 cps. and had a hardening time of 17 minutes, exhibiting overall marginal properties.

Adhesive IVC contains an elastomer content of about 1%. The composition was catalyzed as described in Example 1 and used to bond ABS ("Cycolac" T) to cold rolled steel. The adhesive was also cast into 20 mil thick sheets. The ABS/steel assembly was tested by shearing, with the result that the ABS separated within the plastic stock, yielding a bond strength of 615 p.s.i. The impact resistance of the plastic/steel bond was tested, using a Gardner impact tester with a ⅝" mandrel. After subjection to an impact 30 ft.-lbs., the adhesive was generally crazd within the bond area. A subsequent shearing test yielded a plastic failure with a strength of 540 p.s.i. One-half inch wide strips were cut from the hardened cast sheets. Bending followed by creasing in a metal vise as before caused crazing within the crease area. One cycle of creasing failed to fracture the adhesive; 2 cycles yielded a failure by fracture within the crease area. These results indicate the marginal performance of compositions of this invention containing about 1% of a butadiene elastomer.

Composition IVD contains about the preferred concentration of each component, relative to each other. This example illustrates a flexible adhesive composition with a fast cure that resists unusually high temperatures. Component B monomers are chosen for their collective properties which create the capability to resist continuous temperatures of up to 375° F. and brief exposures even up to 450° F. Adhesive IVD was catalyzed with 2.5 parts of "Cadox" B160, benzoyl peroxide paste dispersion in butyl benzyl phthalate, per 100 parts of adhesive resin and used to bond cold rolled steel together, forming a single overlap assembly. Adhesive IIIC, was used to bond identical assemblies. Composition IIIC is nearly identical to IVD except for the presence of 2-ethyl hexyl acrylate and diethylene glycol dimethacrylate monomers as component B. After each assembly was allowed to harden and condition for 1 hour at 72° F. after joining, they were placed into an air convection oven with a temperature of 345° F. for 45 minutes. After the exposure, the test assemblies were conditioned to 74° F. Adhesive composition IIIC assemblies were examined and found to contain expanded adhesive areas, resembling rigid foam. Shear strengths when the assemblies were tested to destruction averaged only 680 p.s.i. The assemblies bonded with IVD adhesive were unchanged when subjected to visual observation. Test strength averaged 3290 p.s.i. after the thermal exposure for composition IVD. The destructed adhesive areas of IVD exhibited no evidence of gaseous foaming or destructive softening as was grossly evident on the destructed adhesive areas of the test assemblies bonded with adhesive IIIC.

Compositions IVE, IVF, IVG, and IVH contain various concentrations of methacrylic acid. Each composition was tested for cure time by catalyzing a 10 gram mass with 3 parts of benzoyl peroxide paste (50%) per 100 parts of adhesive resin. The cure time is measured by observing the time required for the adhesive resin to become hardened so that a metal blade cannot penetrate the adhesive surface into the adhesive mass. Handling time for most assemblies bonded with these compositions correspond to no more than an additional 10% of time over that of the 10 gram mass method described above. The results of the tests are as follows:

TABLE XV

| Adhesive: | Hardening Cure Time, Minutes |
|---|---|
| IVE | 28.5 |
| IVF | 18.0 |
| IVG | 4.9 |
| IVH | 7.0 |

The cure time test results are based upon operative and preferred concentrations of the various components, except for the methacrylic acid. Small changes in the methacrylic acid content have a large effect on the resulting hardening rate of the adhesive compositions, as can be noted from the table. By shifting the relative component concentrations, other than methacrylic acid, even to ratios where marginal performance results, the cure times can only be nominally affected or changed. The results of the several concentrations of methacrylic acid of examples IVE through IVH are not significantly altered by any such operative component variations under the present invention.

The IVE through IVH adhesives were cast into 20 mil thick sheets. One-half inch wide strips cut from the sheets were bent and creased in a metal vise. Composition IVB, with about 20% methacrylic acid, became severely crazed when creased, fracturing when returned to a flat strip. Adhesive IVH was craze whitened at the crease area, but resumed a flat position without fracture or severe weakening. Adhesives IVE and IVF yielded results without craze whitening or weakening of the crease area. Each adhesive was used to bond aluminum oxide blasted aluminum test sections together. The assembly strengths were as follows:

TABLE XVI

| Adhesive | Test | Results, p.s.i. |
|---|---|---|
| IVE | Aluminum bonded to aluminum, overlap shear test. | 3,750 |
| IVF | | 4,000 |
| IVG | | 3,300 |
| IVH | | 2,500 |

The foregoing tests illustrate that performance limitations arise at concentrations above about 15% and become severely limiting at about 20%. Preferred compositions are obtained with levels of about 7 to 8% or higher, where the other components are near preferred concentrations also. At about 5% levels, the methacrylic acid has such a limited effect on the cure time that the hardening time becomes too lengthy and fails to meet the criteria and objects of the invention. Even when the most favorable ratios of the other components are used, the 5% level still constitutes a limit area in achieving sufficiently fast cure times to meet the demands of the present invention.

Example 5

This example illustrates the use of fillers, pigments and diluent extenders in compositions of the present invention. The compositions of the present invention are particularly distinguished from many related prior art compositions and compounds containing polymerizable acrylic or vinyl monomers by the necessary selectivity and limits thereto of particulate fillers, especially those fillers noted for their ability to reinforce polymer networks. Many common fillers are well known in the art for their reinforcing properties. Included among the great many common extender pigments and fillers are calcium carbonate, talc, silica, zinc oxide, titanium dioxide, calcium silicate, clay, mica, asbestos, and glass fibers, among others. The disadvantage of large concentrations of such pigments and fillers is twofold: (1) since wetting rates of various surfaces are widely varied and of great importance for adhesion, the filler tends to reduce wetting and impair adhesion to many surfaces. Such adhesion loss due to the reduced wetting can easily occur since the gel-hardening times are very short, by design, in the fast curing compositions of this invention; (2) the reinforcing action of the dispersed particles tend to counteract the flexibility of the cured compositions, by exerting their common observed reinforcing effects. Such reinforcement acts to stiffen and rigidify the adhesive, counteracting the desired flexibility and impact resistance obtained as an object of this invention. Examples of variously filled adhesive compositions are given as follows:

Adhesive IA was prepared according to Example 1. After the adhesive was completely blended, the composition was divided into 5 portions. One portion was left unfilled for use as a basis for a later comparison of adhesive and physical properties. Two portions were blended with titanium dioxide pigment and two with a powdered mineral filler, i.e., talc:

TABLE XVII

| | VA | VB | VC | VD | VE |
|---|---|---|---|---|---|
| Adhesive IA | 100 | 99 | 80 | 95 | 80 |
| Titanium dioxide | | 1 | 20 | | |
| Powdered talc | | | | 5 | 20 |

Each mixture was mechanically agitated with a motor driven propeller type mixer. After agitating until a lump free dispersion was obtained, the adhesive compositions were catalyzed by mixing 2.5 parts of a 50% benzoyl peroxide paste ("Cadox" BPO) into 100 parts of each adhesive resin. Sheets, 20 mils in thickness were cast. Sections, ½" wire were cut from the cured sheets. The adhesive films were tested with the following results:

TABLE XVIII

| Adhesive | Test | Results |
|---|---|---|
| VA | Elongation at break, Eb | 15% |
| VB | | 13.5% |
| VC | | 6% |
| VD | | 12% |
| VE | | 5% |
| VA | Tensile modulus at break, Mb | 6,700 p.s.i. |
| VB | | 6,800 p.s.i. |
| VC | | 5,200 p.s.i. |
| VD | | 6,400 p.s.i. |
| VE | | 5,400 p.s.i. |

Adhesive films were also evaluated for bend-flexibility. Each film was bent to smaller radii, to 180°, if possible, and creased in a metal vise. Adhesive VA was creased and straightened without fracture. VB also resisted creasing without cracking. Composition VC fractured during creasing, yielding a brittle fracture before the full 180° crease was reached. VD survived creasing, but was straightened only with the result that the crease area was left much weakened, whereas VA retained a tensile modulus of 4600 p.s.i. after creasing, VD yielded only 350 p.s.i. Composition VE also fractured when subjected to creasing in a vise. It is, however, possible to preserve adequate flexibility, in the presence of reinforcing fillers and pigments by careful choice of component A and C monomers, under the present invention. However, the techniques require large quantities of monomers which form low modulus polymers, usually with very low attendant second order transition temperatures. Balancing the stiffening or reinforcing effects of fillers and pigments with low modulus polymers adversely affects the tensile modulus or strength of the hardened adhesive. Thus, a filled adhesive can be made nearly as flexible as many operative unfilled compositions of this invention, but is achieved only at the expense of the tensile modulus and other critical properties such as the ability to resist high impact stresses. Such filled, lower strength, yet flexible adhesives are also unchanged in their limited ability to wet or adhere to many surfaces. The following formula is an example of a fillable adhesive with improved flexibility:

TABLE XIX

| Component | Ingredient | VE (parts by weight) |
|---|---|---|
| A | Acrylonitrile butadiene elastomer, "Krynac" 803 | 13 |
| B | Methylmethacrylate monomer | 30 |
| | Isobutyl methacrylate monomer | 5 |
| | 2-ethyl hexylacrylate monomer | 10 |
| | Isobutyl acrylate monomer | 5 |
| C | Vinyl acetate monomer | 10 |
| D | Methylmethacrylate/n-butyl acrylate/ethyl acrylate copolymer, 90/5/5 of Example 1. | 17 |
| E | Methacrylic acid | 8 |
| F | Paraffin wax | 0.5 |
| | Diisopropanol-p-toluidine | 1.2 |
| | Diethyl-p-toluidine | 0.3 |

After blending the adhesive ingredients of VE together using mechanical agitation while heating the mixture to 150° F., the adhesive composition was divided into two portions. One portion was filled at a rate of 80 parts of adhesive VE blended with 20 parts of the ground mineral filler, talc. Each portion was catalyzed as previously described and cast into 20 mil thick sheets. One-half inch strips were cut and tested for bending and creasing resistance. Both compositions survived the bending and creasing tests, although the recovery to a flat strip was poor for the filled adhesive in that the crease area of the filled adhesive exhibited considerable memory and resisted attempts to flatten the strip. Strips were tested for elongation at break and tensile modulus at break. The results were as follows:

TABLE XX

| Adhesive | Test | Results |
|---|---|---|
| VE | Tensile elongation at break, Eb | 16% |
| VE plus talc | | 13% |
| VE | Tensile modulus at break, Mb | 3,400 p.s.i. |
| VE plus talc | | 1,050 p.s.i. |

While the elongation at break results compare favorably with other operable adhesives, Example 1 for instance, the tensile strength of those adhesives which can be sufficiently flexibilized exhibit very low cohesive tensile strengths. Such limited strengths lead to frequent performance deficiencies in practical use. The two adhesives were used to bond cold rolled steel test assemblies, forming single overlap joints of the type previously described. The test joints were destructively tested by shearing, yielding the following assembly strengths:

TABLE XXI

| Adhesive | Test | Results |
|---|---|---|
| VE | Tensile overlap shear, cold rolled steel | 2,800 p.s.i. |
| VE plus talc | | 1,450 p.s.i. |

The VE adhesives yielded lower strengths than other adhesives of the present invention, but are still of high structural strength and quality. The VE adhesive plus talc yielded much lower strengths. The strengths are of such reduced modulus that the quality of the joints, in comparison to VE and others such as Example 1 adhesives, is decidedly inferior. Adhesive VE represents a specifically designed composition, under the present invention, to permit high additive concentrations of fillers without unacceptable losses in flexibility. It is seen, however, that lowering the modulus of the adhesive, under the limits of the current invention, yields an adhesive which sacrifices tensile strength when highly filled with pigments or diluent particles. The acceptable limits, about 20% of the total adhesive by weight is in contrast to related, prior art coating and filling compositions where very high filler and pigment levels were operable and used. In such compositions, very high levels are required, for example, to yield adequate hiding power and for masking color changes due to environmental aging or curing. Prior art filling compounds were very highly diluted with fillers to reduce costs and to achieve the necessary low rate of shrinking during the cure. Because of the necessity for very high levels of fillers, considerably above 15 or 20%, these compounds are distinct in their compositions, physical properties and practical uses, which do not include flexibility with impact resistance. Additionally, such compounds do not possess the good surface wetting and the high adhesional strengths of the compositions of the present invention, especially to the variety of plastics and metals which are bonded in meeting one of the prime objects of this invention.

Example 6

This example illustrates the superiority of the compositions of the present invention over prior art elastomer based adhesives generally used as solvent carried cements. Such solution cements require that all or nearly all of the solvent carrier be removed by drying before the assembly parts may be joined. The bonding process is much less practical compared to the present compositions because of the expense and lengthy times required for removing the solvents. In many cases, as noted previously, solvents are unacceptable for use, especially on plastics which become solvent stress crazed when contacted with most common organic solvents. The risk of destruction of the plastic finish outside the joint areas by the solvent carrier is also present. The entire process of applying, drying and assembling bonded components is much longer, and hence more expensive, for solvent elastomer cements than for the present compositions. Further, the solvent cements do not provide the high strength joints which are obtainable with the present compositions, especially when dissimilar metals and plastics are being joined. Frequently, in order to obtain reasonable strengths and heat resistance, the prior art solvent carried, and film adhesives must be baked or post cured at elevated temperatures. Such heat curing requirements are frequently impractical or impossible, due to high equipment and process expenses and the damage caused by heat to sensitive materials. In contrast, the compositions of the present invention provide very fast and inexpensive bonding at room temperatures, without the need for heat curing. The heat resistance resulting from the room temperature cure is still superior to prior art compositions with exposure to temperatures of up to 450° F. being possible. For comparison, a typical rubber based cement was prepared according to the recommendation of the manufacturer of the elastomer. The elastomer used was of the same type contained in the component A of the present invention to permit the comparison to be as reasonable as possible. The cement was prepared according to the directions contained in the B. F. Goodrich Chemical Company bulletin, "Manual HM-4," "Making Cements with Hycar Rubber," June 1959, page 28, table 19, formula number 1. Such solvent carried elastomer cements are well known in the art and are represented by many compositional variations, generally based upon an elastomer plus modifiers such as cosoluble phenolic or thermoplastic additives, dissolved in an organic solvent carrier. One of the earliest elastomer based cements of the prior art is disclosed in U.S. Pat. 1,744,880, which describes a modified rubber as a film or solvent cement. This early prior art adhesive has been followed by many others, such as those contained in the adhesive compounding manual referred to above. All are similar in their compositions. The rubber-phenolic resin cement used to illustrate these adhesives is as follows:

TABLE XXII

| Ingredient: | Parts by wt., VIA |
|---|---|
| Carboxylated acrylonitrile butadiene elastomer, "Hycar" 1072 | 6. |
| Phenolic resinous polymer, "Durez" 12687 | 24. |
| Coumarone resin tackifier | 1.5 |
| Methyl ethyl ketone | 68.5 |

B. F. Goodrich Chemical Company, "Manual HM-4," page 28, Table 19, Formula 1.

The ingredients were agitated together until a complete solution was obtained. The adhesive solution was brushed on cold rolled steel of the same type and grade used in previous examples. The steel was sand blasted and solvent cleaned prior to bonding. After the major portion of the solvent had evaporated, the steel sections were joined together by pressing the coated bond areas together in a hydraulic press. After hardening for 24 hours, the overlap joints had a shearing strength of 90 p.s.i. After one week, the average shearing strength increased to 135 p.s.i. Other assemblies were prepared by air drying the adhesive thoroughly on the bond areas and joining the parts under pressure, followed by curing for 30 minutes at 220° F., with an additional baking period of 25 minutes at 325° F. The shear strength of the resulting assemblies, after conditioning to 72° F., was 760 p.s.i. Even the lengthy heat cure yielded adhesive strengths equal to less than one-fourth of those obtained with compositions of the present invention. The room temperature bonds had even a smaller fraction of the strength of those obtained with the compositions of the present invention.

The solvent carried elastomer-phenolic adhesive was used to bond respectively, polycarbonate to itself, rigid polyvinyl chloride to itself and ABS to steel. The plastics were the same grades which were used in previous examples. The test assemblies were made as described above for room temperature bonding, with a 24 hour post layover, followed by tests by destructive shearing. The polyvinyl chloride assembly failed with an adhesive separation from the plastic surface, yielding a strength of 75 p.s.i. The ABS/steel assembly was destroyed with an adhesive failure from the metal surface, yielding a strength of 84 p.s.i. The polycarbonate assembly yielded a stock break within the plastic with a shear strength of 115 p.s.i. The polycarbonate plastic was severely solvent stress crazed, however, lowering its resulting tensile and flexural strength. The compositions of the present invention yield comparable shear assembly bonds nine times as great as these prior art adhesives. In addition, the present adhesive compositions do not significantly attack or lower the tensile modulus of the sensitive, high impact polycarbonate. As an illustration of the lack of compatibility with engineering thermoplastics such as ABS, polycarbonate, and polyphenylene oxide, a thin layer of each of compositions IIA and VIA was applied to a 1" x 8" x ⅛" section of polycarbonate plastic, where each adhesive layer was ⅛" thick, on a dry film basis. Adhesive IIA and the nitrile elastomer/phenolic cement of Example 6 were respectively applied to one side of the plastic sections. The IIA adhesive was catalyzed as described in Example 2. After allowing each adhesive to harden, open to the atmosphere, for 24 hours at 74° F., the section coated with the nitrile/phenolic cement of Example 6 was baked at 210° F. for 1 hour in an air convection oven to post cure the adhesive. The adhesive coated sections were conditioned to 72° F., and tested for tensile modulus at break. The section coated with the IIA adhesive yielded a strength of 2300 lbs., while a control of uncoated plastic yielded 785 lbs. The section coated with the solvent cement of Example 6 yielded only 75 lbs., with gross evidence of solvent stress crazing attack.

While some improvements could be realized by careful choice of other solvents and the use of highly developed compositions and formulas for specific substrates, other important drawbacks of solvent carried elastomer cements remain and include slow processes, no capacity to fill irregular glue areas, or yield sufficient environmental resistance, especially to solvents and elevated temperatures. The broad capacity of the compositions of the present invention to form bonded joints equal in strength to high strength plastics, especially when dissimilar materials, such as metals are involved, is not obtainable with the solvent carried elastomer cements of the prior art.

What is claimed is:
1. An adhesive composition consisting essentially of:
 (A) about 1 to about 30% of an elastomeric polymer having a glass transition temperature below about 15° F. selected from the group consisting of
  (1) poly(butadiene) homopolymer,
  (2) a copolymer of butadiene with at least one monomer selected from the group consisting of styrene, acrylonitrile, and methacrylonitrile,
  (3) a copolymer of butadiene selected from the group consisting of copolymers derived from (1) butadiene homopolymer and (2) butadiene copolymers, modified by copolymerization therein of from trace amounts up to about 5% by weight of component (3) of a comonomer selected from the group consisting of: acrylic acid, methacrylic acid, maleic anhydride, fumaric acid, methyl methacrylate, styrene, and chlorostyrene;
 (B) about 25 to 85% of at least one acrylic monomer selected from the group consisting of acrylates, methacrylates, acrylonitriles, and methacrylonitrile;
 (C) 0 to about 50% of at least one ethylenically unsaturated non-acrylic monomer;
 (D) 0 to about 60% of a polymer having an intrinsic viscosity in the range from about 0.1 to about 1.3 derived from at least one of said (B) and (C) monomers;

(E) about 5 to about 20% methacrylic acid; and
(F) about 0.04 to about 4% of the reducing component of a redox polymerization catalyst system;

said adhesive containing said ingredients in proportions within said limits which produce a composition which, in the presence of the oxidizing component of said catalyst system, cures under ambient temperature to provide a handleable bond in not more than about 15 minutes, said proportions of components (A), (B), (C), (D), (E), and (F) being by weight of the total composition.

2. An adhesive composition of claim 1 wherein component (A) is a butadiene homopolymer.

3. An adhesive composition of claim 1 wherein component (A) is a copolymer of butadiene and styrene.

4. An adhesive composition of claim 1 wherein component (A) is a copolymer of butadiene and acrylonitrile.

5. An adhesive composition of claim 1 wherein component (A) is a copolymer of butadiene and acrylonitrile modified by copolymerization therein of a minor proportion of a carboxylic acid functional monomer.

6. An adhesive composition of claim 1 wherein component (B) is selected from the group consisting of the lower alkyl acrylates and methacrylates.

7. An adhesive composition of claim 6 wherein component (B) is methylmethacrylate.

8. An adhesive composition of claim 6 wherein component (B) includes hexyl methacrylate.

9. An adhesive composition of claim 6 wherein component (B) includes 2-ethyl-hexyl methacrylate.

10. An adhesive composition of claim 6 wherein component (B) includes isobutyl methacrylate.

11. An adhesive composition of claim 6 wherein component (B) includes isobutyl acrylate.

12. An adhesive composition of claim 1 wherein component (B) includes diethylene glycol dimethacrylate.

13. An adhesive composition of claim 1 wherein component (C) includes vinyl acetate monomer.

14. An adhesive composition of claim 1 wherein component (C) includes styrene monomer.

15. An adhesive composition of claim 1 wherein component (C) includes chlorostyrene monomer.

16. An adhesive composition of claim 1 wherein component (D) includes ethyl methacrylate.

17. An adhesive composition of claim 1 wherein component (D) includes n-butyl methacrylate.

18. An adhesive composition of claim 1 wherein component (D) includes a copolymer of isobutyl methacrylate with n-butyl methacrylate.

19. An adhesive composition of claim 1 wherein component (D) includes a terpolymer of methylmethacrylate, n-butyl acrylate and ethyl acrylate.

20. An adhesive composition of claim 1 containing about 8 to about 12% of component (E) methacrylic acid.

21. An article consisting of two substrates bonded together by an intermediate layer of a cured adhesive composition of claim 1.

22. An article of claim 21 wherein at least one of said substrates is a metal.

23. An article of claim 21 wherein at least one of said substrates is a synthetic plastic.

24. An article of claim 21 wherein one of said substrates is a metal and the other one is a synthetic plastic.

25. An article of claim 21 wherein at least one of said substrates is a high performance engineering thermoplastic.

26. An adhesive composition of claim 1 containing an inert filler up to about 20%, by weight, of the total adhesive composition.

27. An adhesive composition of claim 26 wherein said inert filler is powdered talc.

28. An adhesive composition of claim 26 wherein said inert filler is titanium dioxide.

References Cited
UNITED STATES PATENTS

| | | | |
|---|---|---|---|
| 2,981,650 | 4/1961 | Bader et al. | 260—879 |
| 3,725,504 | 4/1973 | Owston | 260—876 R |

ALLAN LIEBERMAN, Primary Examiner

H. H. FLETCHER, Assistant Examiner

U.S. Cl. X.R.

156—327, 333; 161—203, 217, 218, 219, 247, 253; 260—42.22, 42.37, 879, 880, 881, 885